United States Patent Office 3,228,930
Patented Jan. 11, 1966

3,228,930
PREPARATION OF α-AMINOBENZYL-PENICILLIN
Berndt Olof Harald Sjoberg and Bertil Åke Ekstrom, Sodertalje, Sweden, assignors to Beecham Group Limited, Brentford, England, a British company
No Drawing. Filed July 6, 1962, Ser. No. 208,102
Claims priority, application Great Britain, July 21, 1961, 26,489/61
6 Claims. (Cl. 260—239.1)

This invention relates to a process for the preparation of α-aminobenzylpenicillin, which is described and claimed in Patent No. 2,985,648.

The α-aminobenzylpenicillin produced by the process of the present invention is of value as an antibacterial agent, as a nutritional supplement in animal feeds, as an agent for the treatment of mastitis in cattle and as a therapeutic agent in poultry and animals, including man, in the treatment especially of infectious diseases caused by Gram-positive and Gram-negative bacteria.

The present invention provides a process for preparing a member selected from the group consisting of the acid α-aminobenzylpenicillin of the formula:

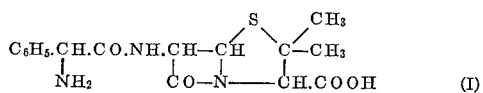

and non-toxic salts thereof, which process comprises catalytically hydrogenating a member selected from the group consisting of the acid α-azidobenzylpenicillin of the formula:

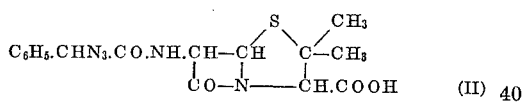

and non-toxic salts thereof.

The α-azidobenzylpenicillin used as starting material in the process of the present invention is described and claimed in our co-pending application Ser. No. 207,793, filed July 5, 1962.

The catalytic hydrogenation is carried out with the α-azidobenzylpenicillin in a suitable solvent or a salt of the azidopenicillin in water or other solvent, ambient temperature and at least atmospheric pressure being preferred for the reaction.

Preferably the catalyst is nickel, e.g. Raney nickel, but other catalysts such as palladium, platinum or rhodium are also suitable. The catalysts may be supported, e.g. on an alkaline earth metal carbonate.

The penicillin mentioned above contains at least one asymmetric carbon atom and will exist in D- and L-forms. It is to be understood that the present invention includes both the D- and L-forms and the DL-mixture.

The product prepared according to this invention can be isolated and purified by the techniques used with other amphoteric penicillins.

The following example illustrates the present invention:

EXAMPLE 1

α-Aminobenzylpenicillin

A suspension of nickel (1 g.) in 30 ml. of water was saturated with hydrogen at room temperature and a pressure of 50 lb./sq. inch. To this suspension was added a solution of the potassium salt of α-azidobenzylpenicillin (4.1 g., with a purity of 83% as determined by the hydroxylamine method) in 30 ml. of water. The mixture was shaken for 30 minutes under a hydrogen atmosphere of 50 lb./sq. inch. The catalyst was filtered off and thoroughly washed with water. The filtrate was adjusted to a pH of 2 with dilute hydrochloric acid and extracted twice with diethyl ether. The pH of the solution was then adjusted with dilute sodium hydroxide to 5. On concentrating the solution in vacuo below 20° C., there was obtained α-aminobenzylpenicillin (3.0 g., 86% yield) in the form of a white powder (purity 61%). The infrared spectrum of this product was identical to that of α-aminobenzylpenicillin obtained from carbobenzoxy-aminobenzylpenicillin as described in Patent No. 2,985,-648 and it inhibited the growth of Staph. aureus Oxford at a concentration of 0.13 mcg./ml.

We claim:

1. A process for preparing a member selected from the group consisting of the acid α-aminobenzylpenicillin of the formula:

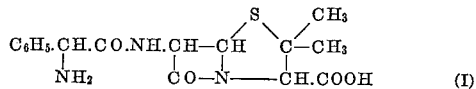

and non-toxic salts thereof, which comprises catalytically hydrogenating with a nickel catalyst a member selected from the group consisting of the acid α-azidobenzylpenicillin of the formula:

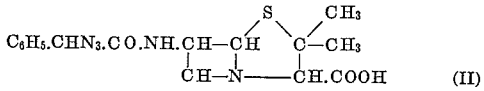

and non-toxic salts thereof under moderate temperature and pressure conditions sufficient to convert azido to amino without disrupting the penicillin nucleus.

2. A process as claimed in claim 1, wherein the temperature is about room temperature and the pressure is between atmospheric pressure and a small multiple thereof.

3. A process for preparing a non-toxic water-soluble salt of the acid α-aminobenzylpenicillin of the formula:

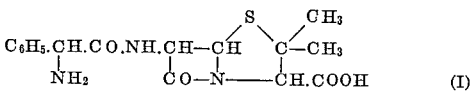

which process comprises catalytically hydrogenating in aqueous solution with a nickel catalyst a non-toxic water-soluble salt of the acid α-azidobenzylpenicillin of the formula:

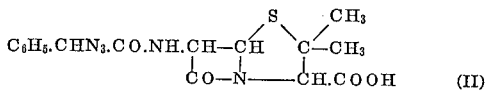

under moderate temperature and pressure conditions sufficient to convert azido to amino without disrupting the penicillin nucleus.

4. A process as claimed in claim 3 wherein said water-soluble non-toxic salt is the potassium salt.

5. A process as claimed in claim 4 wherein the temperature is about room temperature and the pressure is not less than atmospheric pressure and more than a small multiple thereof.

6. A process for preparing α-aminobenzylpenicillin which comprises hydrogenating a solution of the potassium salt of α-azidobenzylpenicillin at about room temperature and under a pressure of about 50 pounds per square inch with a nickel catalyst, removing the catalyst by filtration, acidifying the filtrate to about pH 2, alkalinizing the filtrate to about pH 5, and recovering the resulting α-aminobenzylpenicillin.

References Cited by the Examiner
FOREIGN PATENTS
918,169  2/1963  Great Britain.

OTHER REFERENCES
Boyer et al.: Chemical Reviews, volume 54, No. 1, pages 38–45 (1954).

Claeson et al.: Antibiotics and Chemotherapy, vol. 12, pages 187–191 (March 1962).

NICHOLAS S. RIZZO, *Primary Examiner.*